(12) United States Patent
Lam et al.

(10) Patent No.: US 11,919,562 B2
(45) Date of Patent: Mar. 5, 2024

(54) STEERING MOUNTS WITH CURVED INTERFACES

(71) Applicant: Ford Global Technologies, LLC, Dearborn, MI (US)

(72) Inventors: Anselm Yau-Ching Lam, Northville, MI (US); Matthew Lee Brimmer, Ann Arbor, MI (US); Jackson E. Barry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 16 days.

(21) Appl. No.: 17/669,190

(22) Filed: Feb. 10, 2022

(65) Prior Publication Data

US 2023/0249735 A1 Aug. 10, 2023

(51) Int. Cl.
*B62D 1/16* (2006.01)
*B62D 7/22* (2006.01)

(52) U.S. Cl.
CPC ............ *B62D 1/16* (2013.01); *B62D 7/226* (2013.01); *F16C 2326/24* (2013.01)

(58) Field of Classification Search
CPC ........ B62D 1/16; B62D 7/226; F16C 2326/24
See application file for complete search history.

(56) References Cited

U.S. PATENT DOCUMENTS

| 6,666,438 | B2 * | 12/2003 | Nakagawa | F16F 1/3814 |
| | | | | 267/141.2 |
| 6,767,020 | B2 * | 7/2004 | Yamamoto | A61P 15/00 |
| | | | | 280/124.109 |
| 10,046,795 | B2 * | 8/2018 | Lee | B62D 1/02 |
| 10,322,750 | B2 | 6/2019 | Offerle et al. | |
| 2008/0230676 | A1 * | 9/2008 | Hansemann | F16F 1/3732 |
| | | | | 248/634 |
| 2017/0225708 | A1 * | 8/2017 | Lee | F16F 1/3814 |
| 2018/0273088 | A1 * | 9/2018 | Offerle | B62D 3/12 |
| 2021/0277943 | A1 | 9/2021 | Engelhardt et al. | |

FOREIGN PATENT DOCUMENTS

DE 102012011601 A1 12/2013

* cited by examiner

*Primary Examiner* — Drew J Brown
(74) *Attorney, Agent, or Firm* — Lorne Forsythe; Hanley, Flight & Zimmerman, LLC

(57) ABSTRACT

Steering assembly mounts with curved interfaces are disclosed herein. An apparatus disclosed herein includes a first bushing including a first outer diameter, a first inner diameter, and a first curved surface disposed between the first outer diameter and the first inner diameter, the first curved surface to receive a corresponding second curved surface of the first structure, a second bushing including a second outer diameter, a second inner diameter, and a third curved surface disposed between the second outer diameter and the second inner diameter, the third curved surface to receive a corresponding fourth curved surface of the first structure, and a fastener extending through the first bushing and the second bushing, the fastener to extend through a portion of the second structure.

19 Claims, 7 Drawing Sheets

US 11,919,562 B2

1

STEERING MOUNTS WITH CURVED INTERFACES

FIELD OF THE DISCLOSURE

This disclosure relates generally to automobiles and, more particularly, to power steering assembly mounts with curved interfaces.

BACKGROUND

Automobiles are typically equipped with power steering systems. In such systems, a power steering assembly provides an assistive force to control the orientation of the wheels of the automobile. In these systems, the power steering assembly is typically attached to a chassis of the automobile via one or more mounts.

SUMMARY

An apparatus disclosed herein includes a first bushing including a first outer diameter, a first inner diameter, and a first curved surface disposed between the first outer diameter and the first inner diameter, the first curved surface to receive a corresponding second curved surface of the first structure, a second bushing including a second outer diameter, a second inner diameter, and a third curved surface disposed between the second outer diameter and the second inner diameter, the third curved surface to receive a corresponding fourth curved surface of the first structure, and a fastener extending through the first bushing and the second bushing, the fastener to extend through a portion of the second structure.

An example steering gear assembly disclosed herein includes a steering gear, a steering gear mount to couple the steering gear to a chassis of a vehicle, the steering gear mount including a first curved surface, and a second curved surface opposite the first curved surface, a first bushing including a first end, and a second end including a third curved surface, the third curved surface forming a first interface with the first curved surface, a second bushing including a first end, and a second end including a fourth curved surface, the fourth curved surface forming a second interface with the second curved surface, and a fastener extending through the first bushing, the second bushing and the steering gear mount.

An example vehicle disclosed herein a chassis, a steering gear, a steering gear mount to couple the steering gear to the chassis, the steering gear mount including, a first side, and a second side, a first bushing forming a first curved interface with the first side, a second bushing forming a second curved interface with the second side, and a fastener extending through the first bushing, the second bushing and the steering gear mount.

Figure 1:
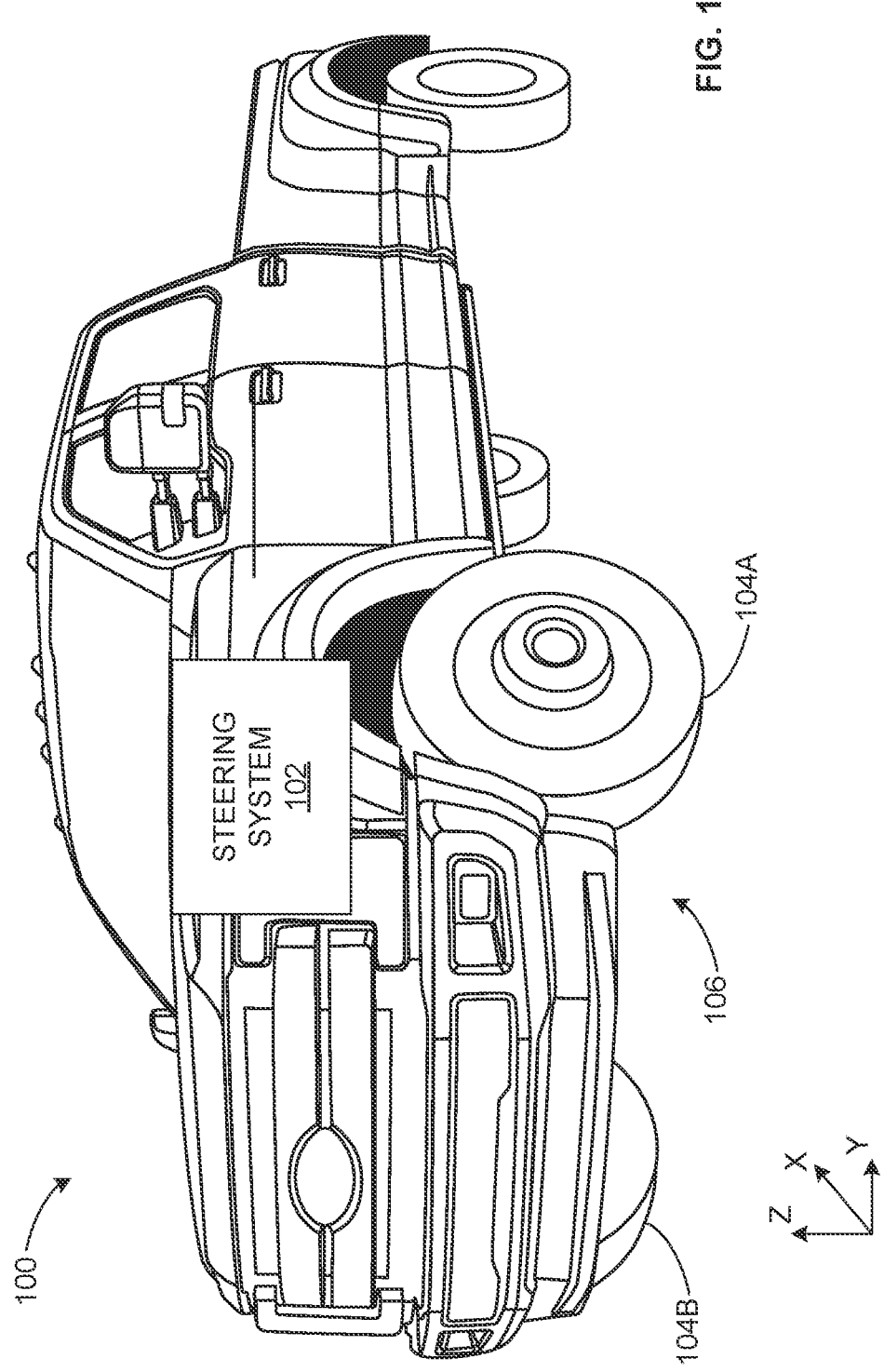
FIG. 1 is a perspective view of a vehicle in which the teachings of this disclosure can be implemented.

The figures are not to scale. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

The figures as depicted herein include patterned shading (e.g., cross-hashing, dot-filling, etc.). Such patterned shading is included for illustrative purposes and should not be construed to refer to the material composition of the parts. Particularly, parts including different shading patterns may be composed of a same material and parts with the same shading patterns may be composed of different materials.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

DETAILED DESCRIPTION

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

As used herein, the orientation of features is described with reference to a lateral axis, a vertical axis, and a longitudinal axis of the vehicle associated with the features. As used herein, the longitudinal axis of the vehicle is parallel to a centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. The terms "below" and "above" are used to refer to directions along the vertical axis closer to the ground and away from the ground, respectively. As used herein, the lateral axis of the vehicle is perpendicular to the longitudinal and vertical axes and is generally parallel to the axles of the vehicle. As used herein, the terms "longitudinal," and "axial" are used interchangeably to refer to directions parallel to the longitudinal axis. As used herein, the terms "lateral" and "horizontal" are used to refer to directions parallel to the lateral axis. As used herein, the term "vertical" is used interchangeably to refer to directions parallel to the vertical axis.

As used herein, the term "steering gear" is used to refer to the mechanical system that transfers driver inputs into a movement of the wheels of the vehicle, such as rack and pinion assemblies. As used herein, the terms "steering mount" and "steering gear mount" are used interchangeably to refer to the fastener(s) and/or mounts that couple the steering gear of a vehicle to the chassis of a vehicle. As used herein, the term "steering system" refers to all components of a steering system of a vehicle, including, but not limited to, steering gear(s), steering column(s), power steering system(s), steering inputs (e.g., steering wheel, etc.), and steering gear mount(s).

Steering mounts disclosed herein include threaded fasteners. As used herein, the term "tightening" refers to a rotation of the fastener that causes further engagement of threads of the fastener and increases the compressive force exerted by the fastener on the other components of the steering mounts. As used herein, the terms "tightened" and "assembled" are used interchangeably to refer to the secured on-chassis ready-for-operation state of the associated steering gear mount.

Vehicles often include dedicated steering systems that include gear(s), linkage(s), and/or actuator(s) that allow the direction of the steered wheels to be changed. These steering systems can be coupled to the frame of the vehicle via one or more steering mounts. These steering mounts need to be sufficiently stiff and tight to enable responsive control to the inputs of the driver. However, during assembly of the vehicle, the tightening of the steering gear mount(s) often introduces internal stresses caused by the deformation of components of the steering gear mount. That is, as the steering gear mount is tightened, manufacturing variations in the assembled parts of the steering mounts cause the parts to deform, thereby inducing pre-strain and internal stresses in the steering gear. The internal stresses caused by manufacturing variations can often cause negative effects perceivable by the driver, such as spontaneous jerking of the steering system (referred to as "stick-slip"), noise, vibration, and hardness (NVH) feedback, and an inability to detect if the driver is in contact with a steering wheel of the steering system, which is important for partially self-driving systems. Additionally, the internal stresses can reduce the lifespan of the components of the steering gear mount and/or steering system.

Some prior steering gear mounts include elastomeric components (e.g., rubber bushings, etc.) to mitigate internal stresses caused by manufacturing variations in the mounting surfaces of the steering gear mount. The use of such material can prevent pre-strain in critical components. Elastomeric material can also isolate other vehicle components from vibration associated with the steering system and isolate the steering system from vibration from other vehicle components. However, the use of elastomeric components can reduce driver-preferred driving characteristics, such as road feedback when compared to steering gear mounts without these features.

Examples disclosed herein include steering mounts with solid bushings including curved surfaces that mate with corresponding curved surfaces on opposite sides of a boss of a steering gear of a vehicle. In some examples disclosed herein, the bushings and the boss slide relative to each other as the steering gear mount is tightened due to manufacturing variations of the bushings and boss. In some examples disclosed herein, the curved surfaces of the bushings and boss form curved interfaces, which are partially spherical (e.g., hemispherical, etc.). In some such examples disclosed herein, the curved interfaces formed by the bushings and the boss introduce an additional degree of freedom (e.g., rotation about an axis perpendicular to the axis mount, etc.), thereby preventing pre-strain of steering gear components from internal bending moments. In some examples disclosed herein, the bushings slide/pivot to find a natural position (e.g., a natural orientation, etc.) associated with the manufacturing variations, thereby preventing undesired internal strains and the binding of components of the steering gear mount. Examples disclosed herein provide large contact surfaces between the bushings and the steering gear to support high clamp loads. Examples disclosed herein reduce the internal stresses on and binding of the fastener, thereby reducing bending of the fastener and increasing the lifespan of the fastener. Examples disclosed herein reduce friction variation among steering gears after being coupled to the frame of a vehicle.

Some steering gear mounts disclosed herein include a mounting fastener with a cap that abuts a first side of a first bushing and passes through the first bushing and the second bushing. In some examples disclosed herein, the first bushing is in contact with the boss. Some such examples disclosed herein include bushings with inner diameters larger than the diameter of the fastener to enable the bushings to slide along the curved interfaces during tightening. In some such examples disclosed herein, the fastener is threadedly coupled to the chassis of a vehicle. In other examples disclosed herein, the fastener is threadedly coupled to a nut that abuts the chassis of the vehicle.

Other example steering gear mounts disclosed herein include a fastener with a cap that abuts the chassis of the vehicle and passes through the chassis, the first bushing, and the second bushing. In some examples disclosed herein, the first bushing is in contact with the chassis of the vehicle and the boss. In some examples disclosed herein, the inner diameters of the hole of the chassis, and the first bushing are larger than the diameter of the fastener to enable sliding along the curved interfaces during assembly. In some such examples disclosed herein, the fastener is threadedly coupled to the second bushing. In some such examples disclosed herein, the steering gear mount and the second bushing include anti-rotation features that prevent relative rotation thereof during assembly. In other such examples disclosed herein, the fastener is threadedly coupled to a nut that abuts the second bushing. Examples disclosed herein include steering gear mounts that are less sensitive to manufacturing variations when compared to prior steering mounts, thereby improving the performance of the steering system, improving the lifespan of components of the steering system and improving driver comfort.

Examples disclosed herein include fasteners with major axes that are aligned along the vertical axis of the vehicle (e.g., perpendicular to the ground, etc.). However, examples disclosed herein are not limited to fasteners that are aligned along the vertical axis and can include mounts with any other orientation (e.g., aligned along the horizontal axis, aligned along the lateral axis, aligned in a plane defined by two or more axes, etc.). Examples disclosed herein include fasteners that illustrated as threaded bolts. However, examples disclosed herein can include any suitable type of fastener(s), including, but not limited to, rivets, screws, etc.

FIG. 1 is a perspective view of a vehicle 100 in which examples disclosed herein can be implemented. In the illustrated example of FIG. 1, the vehicle 100 includes an example steering system 102, an example first wheel 104A, an example second wheel 104B, and an example chassis 106.

The vehicle 100 is a motorized wheel-driven vehicle. In the illustrated example of FIG. 1, the vehicle 100 is a pick-up truck. In other examples, the vehicle 100 can be any type of vehicle with brakes (e.g., a sedan, a coupe, a van, a pick-up truck, a sports utility vehicle, an all-terrain vehicle (ATV), farming equipment, etc.). In some examples, the vehicle 100 includes an internal combustion engine (e.g., a non-electrified vehicle, a partially electrified vehicle, etc.). In other examples, the vehicle 100 can be implemented as a fully electric vehicle.

The steering system 102 allows a user of the vehicle 100 to control/steer the vehicle 100. In some examples, the steering system 102 includes a mechanical linkage between a user interface of the vehicle 100 (e.g., a steering wheel, etc.) and the wheels of the vehicle 100. In other examples, the steering system 102 can be a steer-by-wire system and/or a partially steer-by-wire system. In some examples, the steering system 102 includes an electric-powered steering system. In other examples, the steering system 102 can include any suitable type of powered steering and/or steering assist (e.g., hydraulic, hybrid electro-hydraulic systems, etc.). The steering system 102 includes a steering gear (e.g., a rack and pinion system, a recirculating ball system, etc.). The steering gear of the steering system 102 translates user input (e.g., rotation of a steering wheel, etc.) into linear movement of linkages along the lateral axis, thereby articulating the wheels 104A, 104B. The steering gear of the steering system 102 is coupled to the chassis 106 via one or more steering mounts, which are described below in conjunction with FIGS. 2-7.

The wheels 104A, 104B include a wheel rim and a corresponding tire. While in the illustrated example of FIG. 1, the vehicle 100 has two axles and four wheels, in other examples, the vehicle 100 can have any number of axles and wheels. In the illustrated example of FIG. 1, the first wheel 104A and the second wheel 104B are front wheels, which are articulated by the steering system 102 and used to control the direction of travel of the vehicle 100. In the illustrated example of FIG. 1, the first wheel 104A is a driver-side wheel and the second wheel 104B is passenger-side wheel. In other examples, the steering system 102 can articulate the wheels of any other wheels of the vehicle 100 (e.g., the rear wheels, etc.).

The chassis 106 is the main supporting structure of the vehicle 100 to which the other components of the vehicle 100 are mounted. As used herein, the term "chassis" encompasses all structural elements of the vehicle 100, including the main frame and any associated subframes. In some examples, the chassis 106 can include a body-on-frame configuration (e.g., a ladder frame, a backbone frame, an X-frame, a perimeter frame, a platform frame, etc.). In other examples, the chassis 106 can include a unibody frame.

Figure 2:
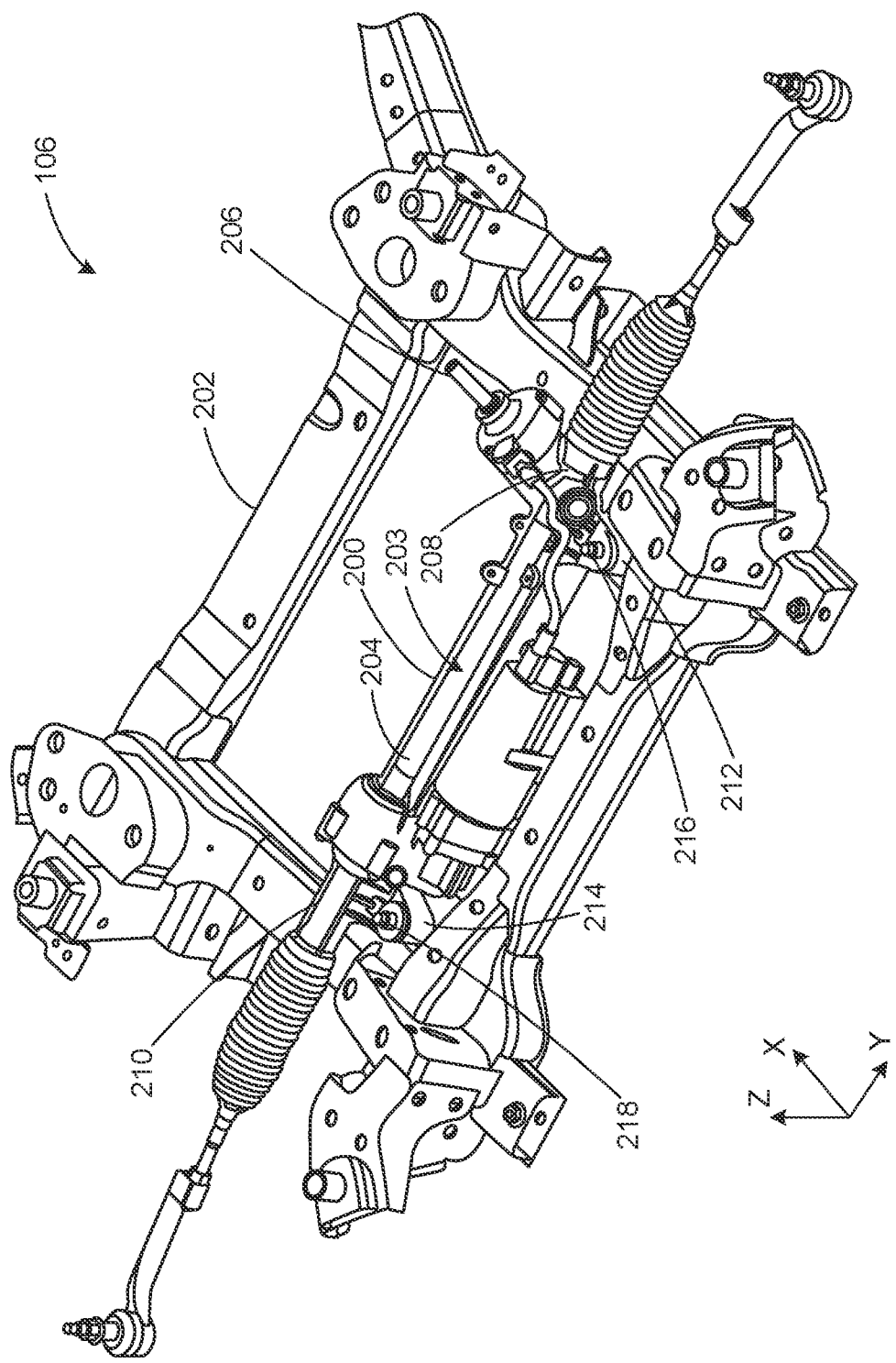
FIG. 2 is a perspective view of a steering gear assembly mounted to a frame of the vehicle of FIG. 1.

FIG. 2 is a perspective view of an example steering gear assembly 200 mounted to an example frame portion 202 of the chassis 106 of FIG. 1. In the illustrated example of FIG. 2, the steering gear assembly 200 includes an example steering gear 203, an example housing 204, an example steering input 206, an example first end 208, and a second end 210. The housing 204 includes an example first mount 212 and an example second mount 214 through which an example first fastener 216 and an example second fastener 218, which couple the steering gear assembly 200 to the frame portion 202.

In the illustrated example of FIG. 2, the steering gear assembly 200 receives driver inputs via the steering input 206 and translates these inputs into lateral movement of wheels, which can be coupled laterally to the ends 208, 210. The housing 204 is a structural feature that encloses the steering gear 203 of the steering gear assembly 200. The steering gear 203 can be a rack and pinion system. In other examples, the steering gear 203 can include any other suitable steering gear mechanism. The housing 204 can be composed of any suitable material (e.g., metal, plastic, etc.) or a combination thereof.

In the illustrated example of FIG. 2, the frame portion 202 is a subframe which can be coupled to the main frame of the chassis 106. In other examples, the frame portion 202 can be a subsection of the mainframe and/or any other suitable portion of the chassis 106. In the illustrated example of FIG. 2, the steering gear assembly 200 is coupled to a cross-member of the frame portion 202 via the mounts 212, 214. Additionally or alternatively, the steering gear assembly 200 can be coupled to any other suitable portion of the frame portion 202 (e.g., a side rail of the frame portion 202, etc.). In the illustrated example of FIG. 2, the two mounts 212, 214 couple the steering gear assembly 200 to the frame portion 202. In other examples, any other suitable number of mounts can be used. In the illustrated example of FIG. 2, the fasteners 216, 218 are aligned along the vertical axis of the vehicle 100. In other examples, the fasteners 216, 218 and/or the mounts 212, 214 can have any other suitable orientation.

In the illustrated example of FIG. 2, the mount 212 is located at the first end 208 adjacent the steering input 206. In other examples, the mount 212 can be located at any other suitable location. The first fastener 216 is inserted from the topside of the steering gear assembly 200 through an opening to threadedly engage with the frame portion 202 to attach the housing 204 to the frame portion 202. In the illustrated example of FIG. 2, the second mount 214 is located at the second end 210, which is adjacent to an engine (not illustrated) of the vehicle 100. In other examples, the second mount 214 can be located at any other suitable location. The second fastener 218 is inserted from the underside of the frame portion 202 through an opening to threadedly engage with the second mount 214 to attach the housing 204 to the frame portion 202.

Figure 3:
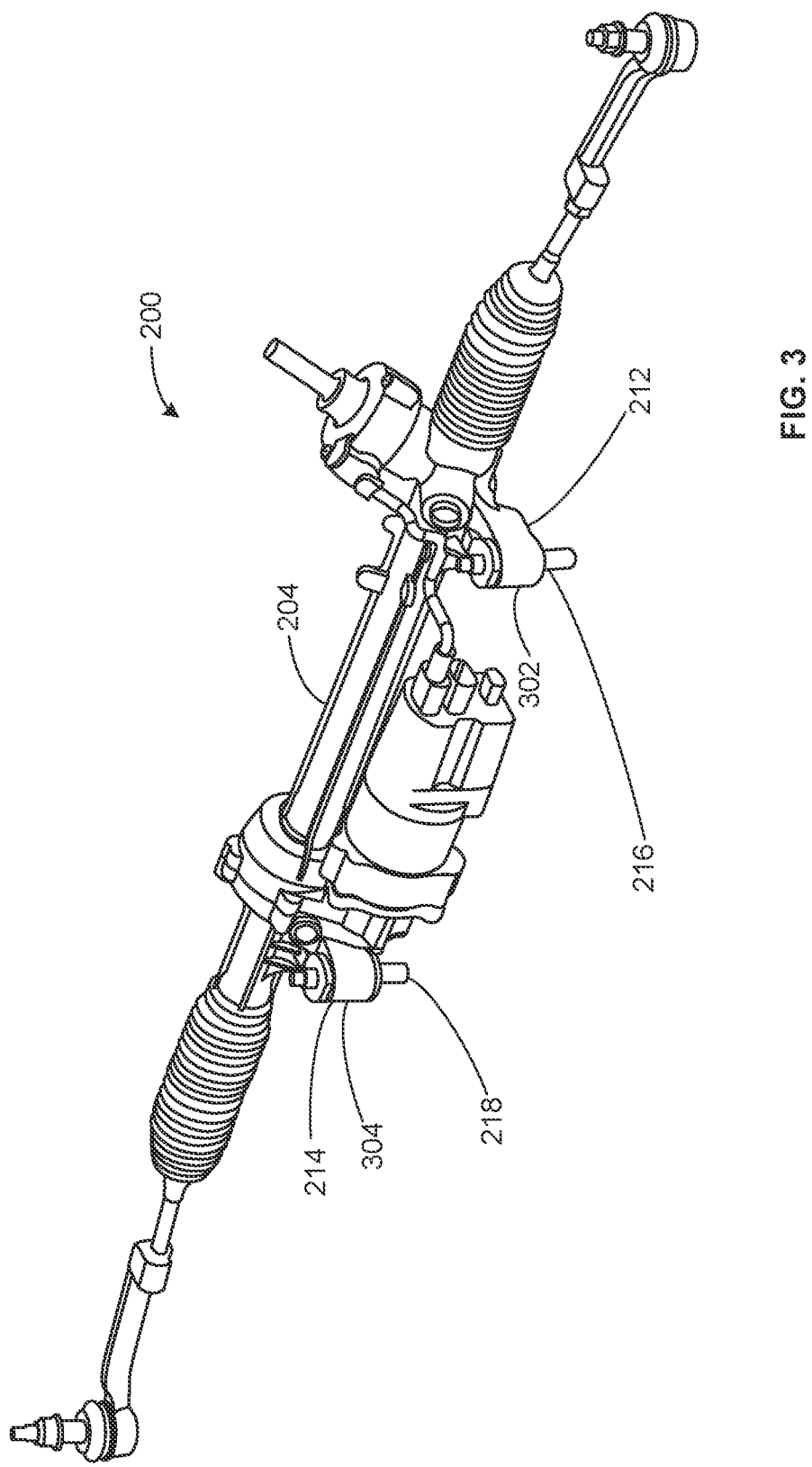
FIG. 3 is a perspective view of the steering gear assembly of FIG. 2.

FIG. 3 is a perspective view of the steering gear assembly 200 of FIG. 2. In the illustrated example of FIG. 3, the mount 212 includes an example boss 302 and the second mount 214 includes an example second boss 302. In the illustrated example of FIG. 3, The bosses 302, 304 are integral with the housing 204. In other examples, the bosses 302, 304 can be separate parts coupled to the housing 204 via one or more fasteners and/or welds.

Figure 4:
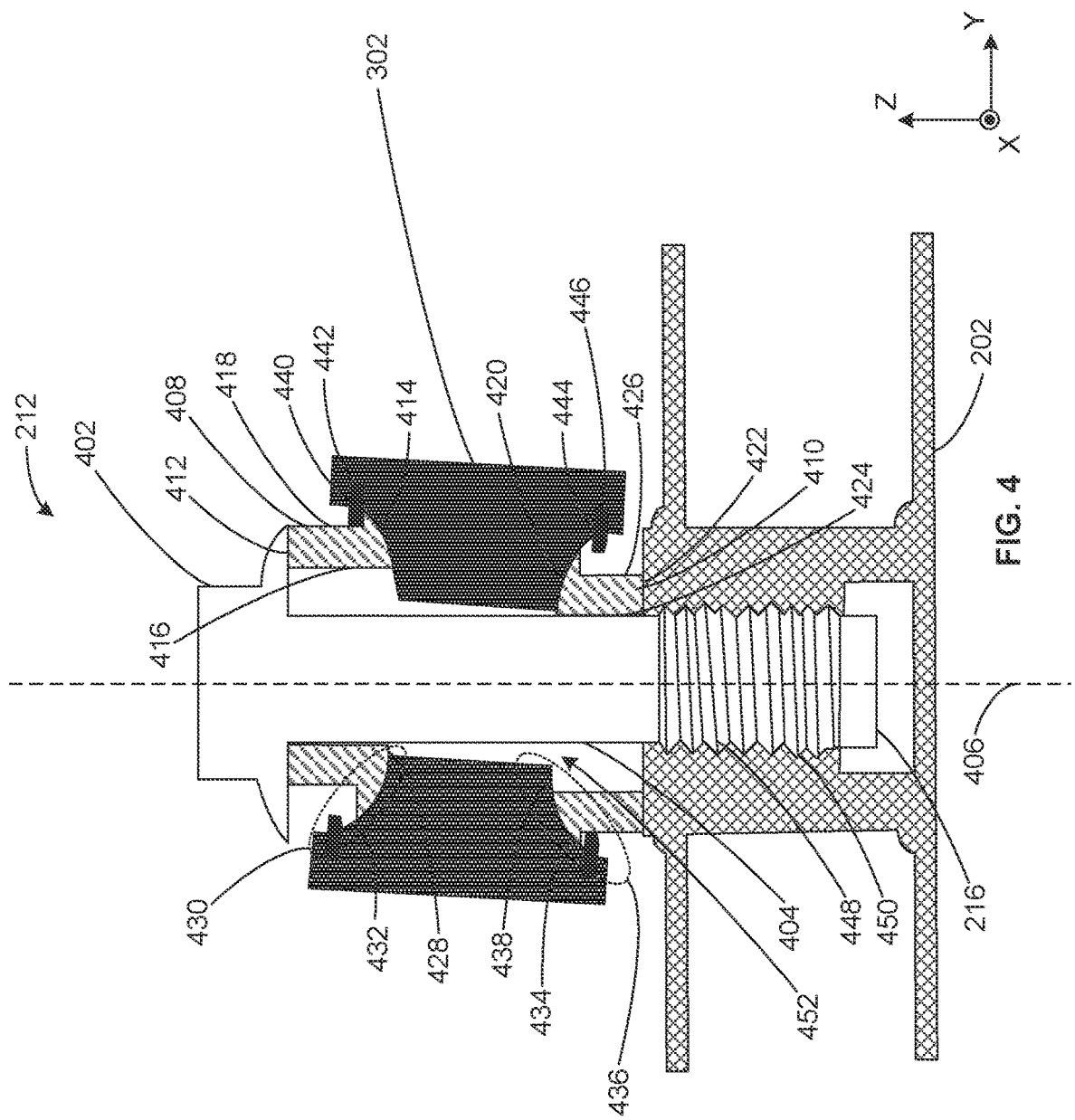
FIG. 4 is a cross-sectional view of the mount of the steering assembly of FIGS. 2 and 3 mounted on the subframe of FIG. 2.

FIG. 4 is a cross-sectional view of the mount 212 of the steering assembly of FIGS. 2 and 3 mounted on the subframe of FIG. 2. In the illustrated example of FIG. 4, the mount 212 includes the example frame portion 202 of FIG. 2, the fastener 216 of FIGS. 2 and 3 and the boss 302 of FIG. 3. In the illustrated example of FIG. 4, the fastener 216 includes an example cap 402 and an example longitudinal portion 404 that defines an example major axis 406. In the illustrated example of FIG. 4, the mount 212 includes an example first bushing 408 and an example second bushing 410. The example first bushing 408 includes an example first end 412, an example second end 414, an example inner diameter 416 extending between the ends 412, 414, and an example outer diameter 418 extending between the ends 412, 414. The example second bushing 410 includes an example third end 420, an example fourth end 422, an example inner diameter 424 extending between the ends 420, 422, and an example outer diameter 426 extending between the ends 420, 422. In the illustrated example of FIG. 4, the second end 414 includes an example first curved surface 428 that forms an example first curved interface 430 with an example second curved surface 432 of the boss 302. In the illustrated example of FIG. 4, the third end 420 includes an example third curved surface 434 that forms an example second curved interface 436 with an example fourth curved surface 438 of the boss 302. In the illustrated example of FIG. 4, the mount 212 includes an example first retention ring 440 disposed in an example first groove 442 in the second curved surface 432 and an example second retention ring 444 disposed in an example second groove 446 in the fourth curved surface 438. In the illustrated example of FIG. 4, the fastener 216 includes example first threads 448, which are received by example second threads 450 of the frame portion 202.

The bushings 408, 410 are solid bearings. In the illustrated example of FIG. 4, the fastener 216 can act as a journal which is retained by the inner diameters 416, 424 of corresponding ones of the bushings 408, 410, respectively. The bushings 408, 410 can be composed of any suitable rigid material including aluminum, steel, etc. In some examples, some or all of the surfaces of the bushings 408, 410 (e.g., the inner diameters 416, 424, the curved surfaces 428, 438, etc.) can include a chemical lubricant (e.g., grease, oils, fluids, etc.) and/or a low friction liner (e.g., a polyethylene lining, a polytetrafluoroethylene lining, etc.) disposed thereon. In the illustrated example of FIG. 4, the bushings 408, 410 are generally mushroom-shaped (e.g., have a curved cap, having a pileus, etc.) due to curvature of the second curved surface 432 and the fourth curved surface 438 that extend radially beyond the outer diameters 418, 426, respectively. In some such examples, the shape of the bushings 408, 410 facilitates the retention of the bushings 408, 410 by the retention rings 440, 444. In other examples, the bushings 408, 410 can be cylinders with ends (e.g., the ends 414, 420, etc.) with curved surfaces.

In the illustrated example of FIG. 4, the fastener 216 retains the bushings 408, 410, the boss 302, and the frame portion 202 in compression. In the illustrated example of FIG. 4, the longitudinal portion 404 of the fastener 216 extends through an opening in the center of the bushings 408, 410, and the boss 302. In the illustrated example of FIG. 4, the threads 448 of the fastener are external threads that mate to the threads 450 of the frame portion 202. In other examples, the threads 448 can be internal threads and the threads 450 can be external threads. In other examples, the threads 450 can be associated with a nut disposed within, abutting or adjacent to the frame portion 202. In some examples, the fastener 216 can be composed of any suitable material (e.g., steel, aluminum, cast iron, etc.). In the illustrated example of FIG. 4, rotational force applied to the fastener 216 (e.g., via the cap 402, etc.) causes the threads 448 to engage or disengage from the threads 450, which correspondingly increases or decreases the compressive force applied to the bushings 408, 410, the boss 302, and the frame portion 202.

In the illustrated example of FIG. 4, the second curved surface 432 and the fourth curved surface 438 are on opposite sides of the boss 302 relative to the vertical axis. In the illustrated example of FIG. 4, the curved surfaces 432, 438 are partially spherical (e.g., hemispherical, bowl-shaped, etc.) surfaces including an example hole 452, through which the longitudinal portion 404 of the fastener 216 passes. In the illustrated example of FIG. 4, the curved surfaces 432, 438 are concave and the curved surfaces 428, 434 of the bushings 408, 410 are convex. In other examples, the curved surfaces 432, 438 are convex and the curved surfaces 428, 438 of the bushings 408, 410 are concave. The curved interfaces 430, 436 formed by the curved surfaces 428, 432, 434, 438 enable the bushings 408, 410 to slide relative to the boss 302 as the faster 408 is tightened.

In the illustrated example of FIG. 4, the mount 212 is assembled and the fastener 216 has been disposed tightly within the frame portion via the threads 448, 450. In the illustrated example of FIG. 4, the cap 402 of the fastener 216 abuts the first end 412 of the first bushing 408. The first curved surface 428 of the second end 414 of the bushing 408 abuts the second curved surface 432 of the boss 302 to form the first curved interface 430. In the illustrated example of FIG. 4, the fourth curved surface 438 of the boss 302, opposite the second curved surface 432, abuts the third curved surface 434 of the second bushing 410 to form the second curved interface 436. In the illustrated example of FIG. 4, the fourth end 422 of the bushing 410 abuts the frame portion 202. In the illustrated example of FIG. 4, the mount 212 is tightened and relative movement of the bushing 408, 410, the boss 302, and the frame portion 202 is prevented by deposition of the fastener 216 within the frame portion 202. In some examples, one or more washers (not illustrated) can be disposed between the cap 402 and the first bushing 408 and/or the frame portion 202 and the second bushing 410.

In the illustrated example of FIG. 4, in the tightened state of the mount 212, the bushings 408, 410 and the boss 302 are not concentrically aligned with the fastener 216. Prior to the tightening of the fastener 216, the bushings 408, 410 and the boss 302 can be concentrically aligned. As the fastener 216 is tightened and a compressive force is applied to the bushings 408, 410 and the boss 302, the curved interfaces 430, 436 permit the bushings 408, 410 to slide laterally relative to along the curved surfaces 432, 438 of the boss 302. That is, instead of deforming due to the compressive force associated with the tightening of the fastener 216, the bushings 408, 410 are able to pivot to a location that minimizes pre-strain and internal stresses. As such, the internal stresses and strain associated with the deformation due to tightening of the fastener 216 are minimized, thereby improving the performance of the mount 212 compared to prior art mounts. Due to manufacturing variations of the bushings 408, 410 and the boss 302 (e.g., irregularities in the curved surfaces 428, 432, 434, 438, minor sizing variations in the bushings 408, 410, etc.), the tightened positions of the bushings 408, 410 relative to the fastener 216 and/or boss 302 varies between different implementations of the mount 212.

The mount 212, once tightened, maintains the relative alignment between the boss 302 (e.g., the steering gear assembly 200, etc.), the fastener 216, and the frame portion 202. The retention rings 440, 444 and the grooves 442, 446 retain the bushings 408, 410 prior to the tightening of the fastener 216 via the threads 448, 450. In some examples, the retention ring 440, 444 prevent the bushings 408, 410, respectively, from sliding along the curved interfaces 430, 436 prior to the mounting of the boss 302. In some examples, bushings 408, 410 are retained via a compression force and/or frictional force associated with the tightened fastener 216. As such, in some such examples, the retention rings 440, 444 can be removed after the assembly of the mount 212. In some examples, the retention rings 440, 444 and/or the grooves 442, 446 are absent. In such examples, assembly aids (e.g., clamps, etc.) can be used to assist with the assembly of the mount 212.

Figure 5:
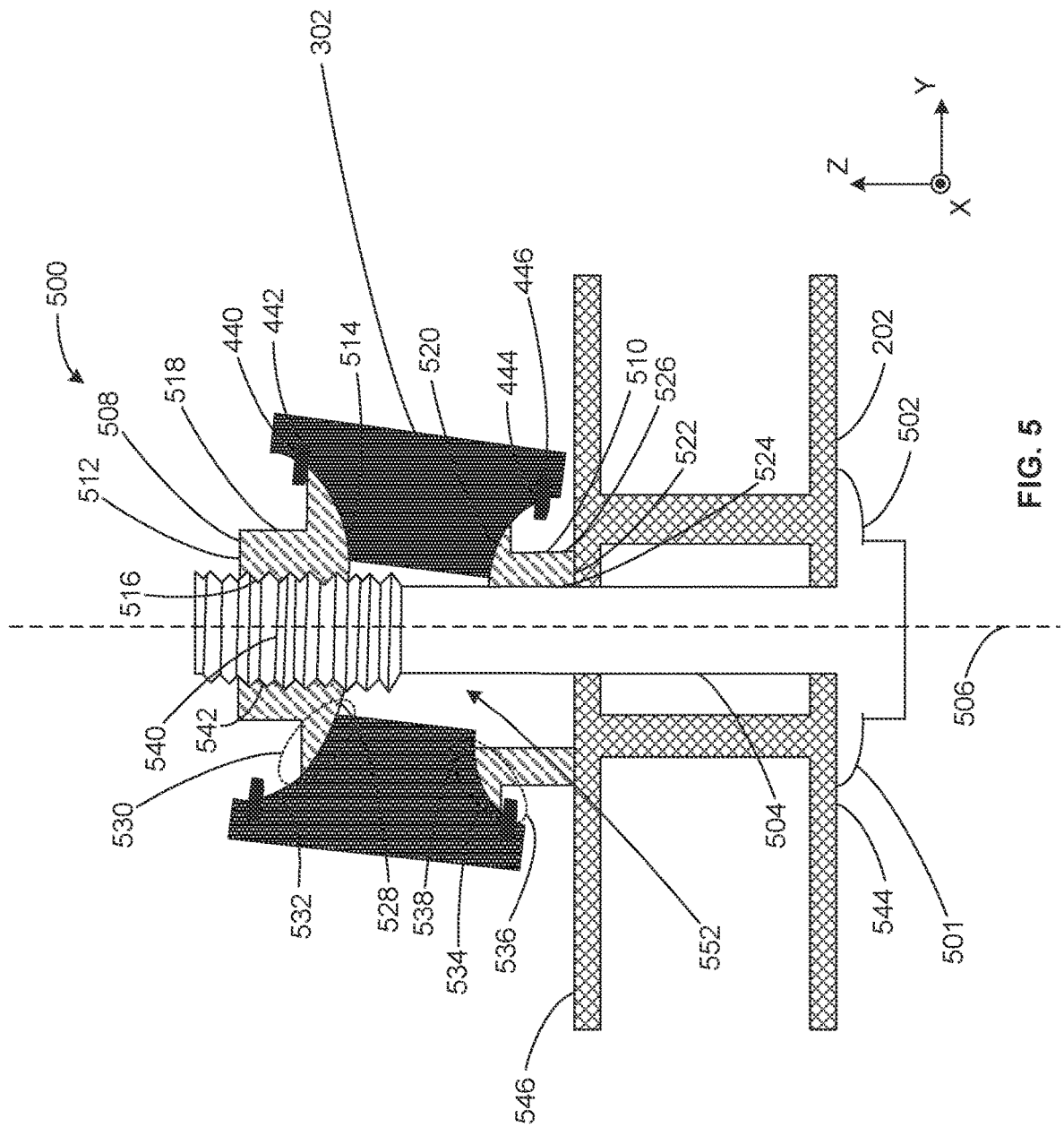
FIG. 5 is a cross-sectional view of another mount that may be used to couple the steering assembly of FIGS. 2 and 3 mounted on the subframe of FIG. 2.

FIG. 5 is a cross-sectional view of another example mount 500 that may be used to couple the steering assembly of FIGS. 2 and 3 mounted on the subframe of FIG. 2 additionally or alternatively to the mount 212 of FIGS. 2-4. In the illustrated example of FIG. 5, the mount 500 includes the example frame portion 202 of FIG. 2 and the boss 302 of FIG. 3. The example mount 500 includes an example fastener 501, which can be used to implement the fastener 216 of FIGS. 2-4. In the illustrated example of FIG. 5, the fastener 501 includes an example cap 502 and an example longitudinal portion 504 that defines an example major axis 506. In the illustrated example of FIG. 5, the mount 500 includes an example first bushing 508 and an example second bushing 510. In the illustrated example of FIG. 5, the example first bushing 508 includes an example first end 512, an example second end 514, an example inner diameter 516, and an example outer diameter 518 and the example second bushing 510 includes an example first end 520, an example second end 522, an example inner diameter 524 extending between the ends 520, 522, and an example outer diameter 526 extending between the ends 520, 522. In the illustrated example of FIG. 5, the second end 514 includes an example first curved surface 528 that forms an example first curved interface 530 with an example second curved surface 532 of the boss 302. In the illustrated example of FIG. 5, the third end 520 includes an example third curved surface 534 that forms an example second curved interface 536 with an example fourth curved surface 538 of the boss 302. In the illustrated example of FIG. 5, the mount 500 includes the first retention ring 440 of FIG. 4 disposed in the first groove 442 of FIG. 4 in the second curved surface 532 and the second retention ring 444 of FIG. 4 disposed in the groove 446 of FIG. 4 in the fourth curved surface 538. In the illustrated example of FIG. 5, the fastener 501 includes example first threads 540, which are received by example second threads 542 of the frame portion 202.

In the illustrated example of FIG. 5, the bushings 508, 510 are solid bearings. The fastener 501 can act as a journal that is retained by the inner diameter of the 524 of the second bushing 510. The bushings 508, 510 can be composed of any suitable rigid material including aluminum, steel, etc. Some or all of the surfaces of the bushings 408, 410 (e.g., the inner diameters 524 of the second bushing 510, the curved surfaces 428, 438, etc.) can include a chemical lubricant (e.g., grease, oils, fluids, etc.) and/or a low friction liner (e.g., a polyethylene lining, a polytetrafluoroethylene lining, etc.). In the illustrated example of FIG. 5, the bushings 508, 510 are generally mushroom-shaped (e.g., have a curved cap, having a pileus, etc.) due to curvature of the first curved surface 528 and the third curved surface 534 that extend radially beyond the outer diameters 518, 526, respectively. In other examples, the bushings 508, 510 can be cylinders with ends (e.g., the ends 514, 520, etc.) with curved surfaces.

In some examples, the fastener 501 can be composed of any suitable material (e.g., steel, aluminum, cast iron, etc.).

In the illustrated example of FIG. 5, the fastener 501 retains the bushings 508, 510, the boss 302, and the frame portion 202 in compression. In the illustrated example of FIG. 5, the longitudinal portion 504 of the fastener 216 extends through an opening in the center of the bushings 508, 510, and the boss 302. In the illustrated example of FIG. 5, the threads 540 of the fastener 501 are external threads that mate to the threads 542 of the first bushing 508. In other examples, the threads 540 can be internal threads and the threads 542 can be external threads. In some examples, the fastener 501 can be composed of any suitable material (e.g., steel, aluminum, etc.). In the illustrated example of FIG. 5, rotational force applied to the fastener 501 (e.g., via the cap 502, etc.) causes the threads 540 to engage or disengage from the threads 542, which correspondingly increases or decreases the compressive force applied to the bushings 508, 510, the boss 302, and the frame portion 202.

In the illustrated example of FIG. 5, the second curved surface 532 and the fourth curved surface 538 of the boss 302 are on opposite sides of the boss 302 relative to the vertical axis. In the illustrated example of FIG. 5, the curved surfaces 532, 538 are partially spherical (e.g., hemispherical, bowl-shaped, etc.) surfaces including an example hole 552, through which the longitudinal portion 504 of the fastener 501 passes. In the illustrated example of FIG. 5, the curved surfaces 532, 538 are concave and the curved surfaces 528, 534 of the bushings 508, 510 are convex. In other examples, the curved surfaces 532, 538 are convex and the curved surfaces 528, 538 of the bushings 508, 510 are concave. The curved interfaces 530, 536 formed by the curved surfaces 528, 532, 534, 538 enable the second bushings 510 to slide relative to the boss 302 as the faster 501 is tightened.

In the illustrated example of FIG. 5, the mount 500 is assembled and the fastener 501 has been disposed tightly within the frame portion via the threads 540, 542. In the illustrated example of FIG. 5, the cap 502 of the fastener 501 abuts an example first surface 544 the frame portion 202. In the illustrated example of FIG. 5, the second end 522 of the second bushing 510 abuts an example second surface 546 of the frame portion 202. The curved surface 534 of the third end 520 of the second bushing 510 abuts the curved surface 538 to form the second curved interface 536. In the illustrated example of FIG. 5, the second curved surface 532 of the boss 302, opposite the second curved interface 536, abuts the first curved surface 528 of the second end 514 of the first bushing 508 to form the first curved interface 530. In the illustrated example of FIG. 5, the mount 500 is tightened and relative movement of the bushing 508, 510, the boss 302 and the frame portion 202 is prevented by deposition of the fastener 501 within the frame portion 202.

The coupling of the first bushing 508 to the fastener 501 via the threads 540, 542 causes the bushings 508 to be concentrically aligned with the fastener 501 in both the tightened state of the mount 500 (as illustrated in FIG. 5) and the untightened state of the mount 500. In the illustrated example of FIG. 5, in the tightened state of the mount 500, the second bushing 510 and the boss 302 are not concentrically aligned with the longitudinal portion 504 of the fastener 501. Prior to the tightening of the fastener 501, the second bushing 510, the boss 302, and the fastener 501 can be concentrically aligned. As the fastener 501 is tightened and a compressive force is applied to the bushings 508, 510 and the boss 302, the curved interfaces 530, 536 permit the second bushing 510 to slide laterally along the curved surfaces 532, 538 of the boss 302. That is, instead of deforming due to the compressive force associated with the tightening of the fastener 501, the bushings 508, 510 are able to pivot about the fastener 501 to a location that minimizes pre-strain and internal stresses. As such, the internal stresses and strain associated with the deformation of tightening of the fastener 501 are reduced, thereby improving the performance of the mount 500 compared to prior art mounts. Due to manufacturing variations of the bushings 508, 510 and the boss 302 (e.g., irregularities in the curved surfaces 528, 532, 534, 538, minor sizing variations in the bushings 408, 410, etc.), the tightened positions of the second bushing 510 relative to the fastener 501 and boss 302 varies between different instances of the mount 500.

The mount 500, when tightened, maintains the relative alignment between the boss 302 (e.g., the steering gear assembly 200, etc.), the fastener 501, and the frame portion 202. The retention rings 440, 444 and the grooves 442, 446 retain the bushings 508, 510 prior to the tightening of the fastener 501 via the threads 540, 542. In some examples, the retention rings 440, 444 prevent the bushings 508, 510, respectively, from sliding along the curved interfaces 530. 536 prior to the mounting of the boss 302. In some examples, the bushings 508, 510 are retained via a compression force and/or frictional force associated with the tightened fastener 501. As such, in some such examples, the retention rings 440, 444 can be removed after the assembly of the mount 500. In some examples, the retention rings 440, 444 and/or the grooves 442, 446 are absent. In such examples, assembly aids (e.g., clamps, etc.) can be used to assist with the assembly of the mount 500.

Figure 6:
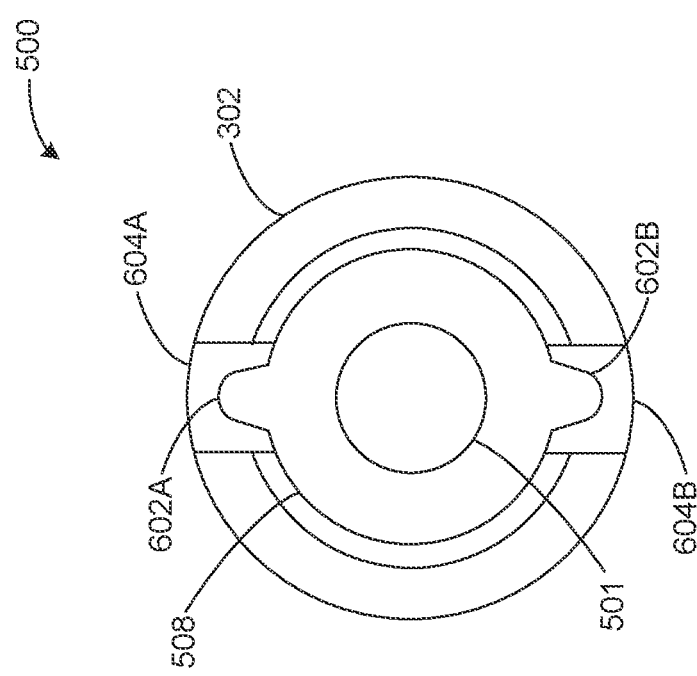
FIG. 6 is a top view of the mount of FIG. 5.

FIG. 6 is a top view of the mount 500 of FIG. 5. In the illustrated example of FIG. 6, the first bushing 508 includes an example first anti-rotation feature 602A and an example second anti-rotation feature 602B. In the illustrated example of FIG. 6, the boss 302 includes an example third anti-rotation feature 604A and an example fourth rotation feature 604B. As the fastener 501 is initially tightened via an applied torque, the threads associated with the bushing 508 (e.g., the threads 542 of FIG. 5, etc.) and threads associated with the fastener 501 (e.g., the threads 540 of FIG. 5, etc.) threadedly coupled the fastener 501 and the first bushing 508. Absent the anti-rotation features 602A, 602B, 604A, 604B, additionally applied torque would cause the bushing to rotate about the vertical axis within the boss 302 without the further tightening of the associated threads. That is, during the tightening of the fastener 501 of the mount 500, the anti-rotation features 602A, 602B, 604A, 604B prevent relative rotation of the first bushing 508 and the boss 302.

In the illustrated example of FIG. 6, the anti-rotation features 602A, 602B of the first bushing 508 are protrusions, and the anti-rotation features 604A, 604B are slots. In some such examples, during the tightening of the mount 500, initial rotation of the fastener 501 cause the anti-rotation features 602A, 602B of the first bushing 508 to abut the anti-rotation features 604A, 604B of the boss 302, thereby rotating locking the first bushing 508 and the boss 302 during further rotation of the fastener 501. In other examples, the anti-rotation features 602A, 602B. 604A, 604B can include any other suitable mechanical features or combination thereof.

Figure 7:
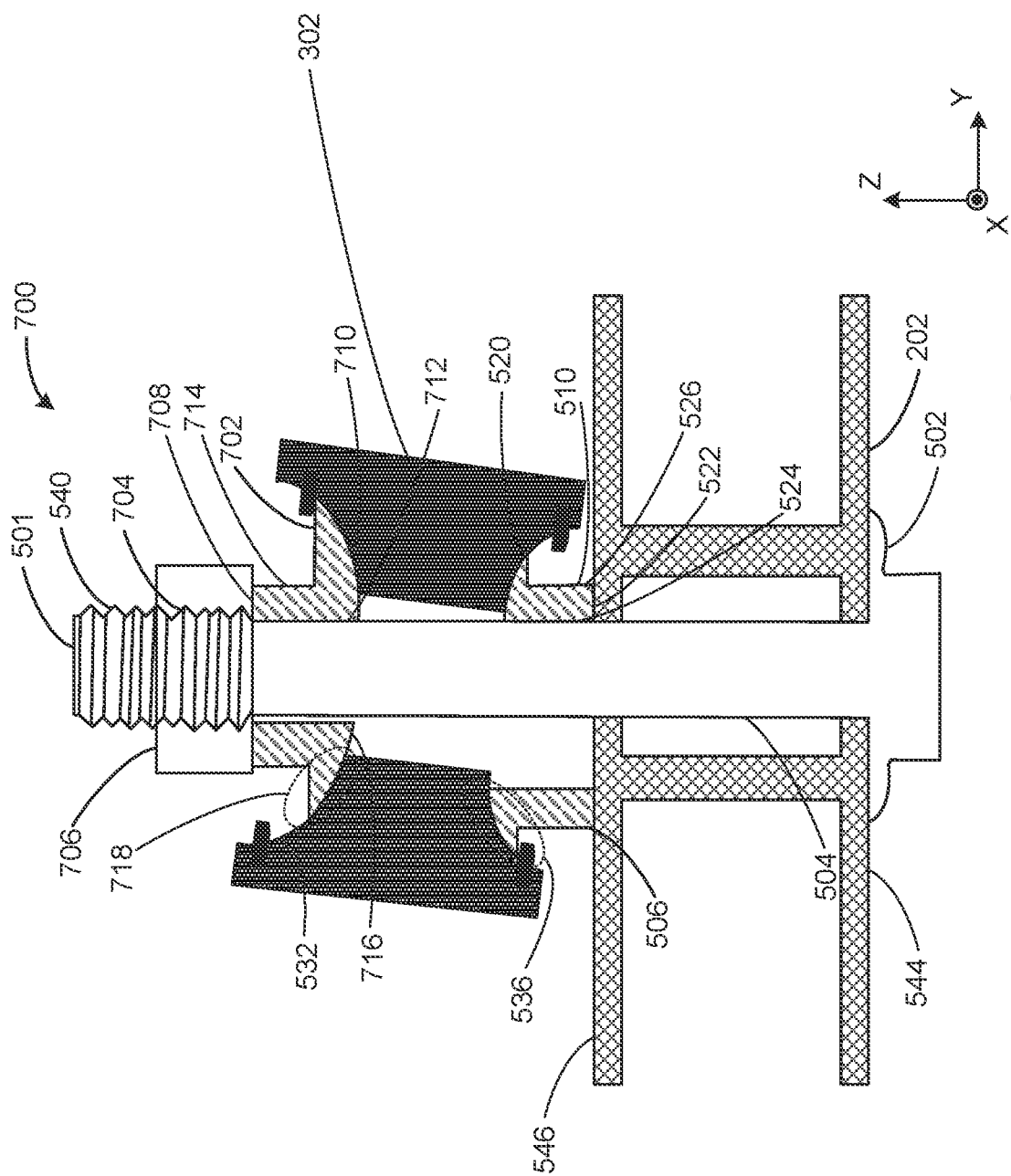
FIG. 7 is a cross-sectional view of another mount that may be used to couple the steering assembly of FIGS. 2 and 3 mounted on the subframe of FIG. 2.

FIG. 7 is a cross-sectional view of another example mount 700 that may be used to couple the steering assembly of FIGS. 2 and 3 mounted on the subframe of FIG. 2. The example mount 700 of FIG. 7 is similar to the mount 500 of FIG. 5. Unless stated otherwise, the example mount 700 includes the same features and functionality as the mount 500. In the illustrated example of FIG. 7, the example mount 700 includes an example first bushing 702, the example fastener 501 of FIG. 4, the example second bushing 506 of FIG. 5, and the example boss 302 of FIGS. 3-5. In the illustrated example of FIG. 7, the first threads 540 of the fastener 501 are received by corresponding example threads 704 of an example nut 706. In the illustrated example of FIG. 7, the first bushing 702 includes an example first end 708, an example second end 710, an example inner diameter 712, and an example outer diameter 714. In the illustrated example of FIG. 7, the second end 710 includes an example curved surface 716 that forms an example curved interface 718 with the curved surface 532 of the boss 302.

In the illustrated example of FIG. 7, the mount 700 includes the nut 706 with the example threads 704, which receive the threads of the 540. During assembly of the mount 700, the torque required to tighten the mount 700 can be applied to the nut 706 to further engage the threads 704, 540. Because the bushing 702 does not include threads (e.g., unlike the bushing 508 of FIG. 5), the anti-rotation features 602A, 602B, 604A, 604B of FIG. 6 do not need to be present to enable the tightening of the mount 700.

In the illustrated example of FIG. 7, the mount 700 is assembled and the fastener 501 is disposed tightly within the frame portion 202 via the threads 540, 704. In the illustrated example of FIG. 7, the cap 502 of the fastener 501 abuts the first surface 544 the frame portion 202. In the illustrated example of FIG. 7, the second end 522 of the second bushing 510 abuts the example second surface 546 of the frame portion 202. In the illustrated example of FIG. 7, the second bushing 510 abuts the boss 302 to form the second curved interface 536. In the illustrated example of FIG. 7, the curved surface 532 of the boss 302, opposite the second curved interface 536, abuts the curved surface 716 of the second end 710 of the first bushing 702 to form the first curved interface 718. In the illustrated example of FIG. 7, the mount 700 is tightened and relative movement of the bushing 702, 510, the boss 302 and the frame portion 202 is prevented by deposition of the fastener 501 within the frame portion 202.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

Example methods, apparatus, systems, and articles of manufacture for steering mounts with curved interfaces are disclosed herein. Further examples and combinations thereof include the following:

Example 1 includes an apparatus to couple a first structure to a second structure, the apparatus comprising a first bushing including a first outer diameter, a first inner diameter, and a first curved surface outer diameter disposed between the first outer diameter and the first inner diameter, the first curved surface to receive a corresponding second curved surface of the first structure, a second bushing including a second outer diameter, a second inner diameter, and a third curved surface disposed between the second and the second inner diameter, the third curved surface to receive a corresponding fourth curved surface of the first structure, and a fastener extending through the first bushing and the second bushing, the fastener to extend through a portion of the second structure.

Example 2 includes the apparatus of example 1, further including a first retention ring to be disposed within a first groove of the second curved surface, and a second retention ring to be disposed within a second groove of the fourth curved surface.

Example 3 includes the apparatus of example 1, wherein the first bushing is threadedly coupled to the fastener.

Example 4 includes the apparatus of example 3, wherein the first bushing includes a first anti-rotation feature to be received by a corresponding second anti-rotation feature of the first structure, the first anti-rotation feature and the second anti-rotation feature to prevent relative rotation of the first bushing and the first structure.

Example 5 includes the apparatus of example 1, further including a nut abutting the first bushing, the nut threadedly coupled to the fastener.

Example 6 includes the apparatus of example 1, wherein the first curved surface and the second curved surface are convex.

Example 7 includes the apparatus of example 1, further including at least one of a lubricant disposed on the first curved surface or a liner disposed on the first curved surface.

Example 8 includes a steering gear assembly including a steering gear, a steering gear mount to couple the steering gear to a chassis of a vehicle, the steering gear mount including a first curved surface, and a second curved surface opposite the first curved surface, a first bushing including a first end, and a second end including a third curved surface, the third curved surface forming a first interface with the first curved surface, a second bushing including a first end, and a second end including a fourth curved surface, the fourth curved surface forming a second interface with the second curved surface, and a fastener extending through the first bushing, the second bushing and the steering gear mount.

Example 9 includes the steering gear assembly of example 8, further including a first retention ring disposed within a first groove of the first curved surface, and a second retention ring disposed within a second groove of the second curved surface.

Example 10 includes the steering gear assembly of example 8, wherein the first bushing is threadedly coupled to the fastener.

Example 11 includes the steering gear assembly of example 10, wherein the first bushing includes a first anti-rotation feature, and the steering gear mount includes a second anti-rotation feature, the first anti-rotation feature and the second anti-rotation feature to prevent relative rotation of the first bushing and the steering gear mount.

Example 12 includes the steering gear assembly of example 8, further including a nut abutting the first bushing, the nut threadedly coupled to the fastener.

Example 13 includes the steering gear assembly of example 8, wherein the first curved surface and the second curved surface are concave, and the third curved surface and the fourth curved surface are convex.

Example 14 includes the steering gear assembly of example 8, further including at least one of a lubricant disposed on the first curved surface or a liner disposed on the first curved surface.

Example 15 includes a vehicle including a chassis, a steering gear, a steering gear mount to couple the steering gear to the chassis, the steering gear mount including, a first side, and a second side, a first bushing forming a first curved interface with the first side, a second bushing forming a second curved interface with the second side, and a fastener extending through the first bushing, the second bushing and the steering gear mount.

Example 16 includes the vehicle of example 15, wherein the first bushing includes a first surface and a second surface, the first surface abutting the first side, the second surface abutting the chassis, the first surface opposite the second surface.

Example 17 includes the vehicle of example 16, wherein the second bushing includes a third surface and a fourth surface, the third surface abutting the second side, the fourth surface abutting a cap of the fastener, the third surface opposite the fourth surface.

Example 18 includes the vehicle of example 16, wherein the second bushing includes a third surface and a fourth surface, the third surface abutting the second side, the fourth surface abutting a nut, the third surface opposite the fourth surface, the nut threadedly coupled to the fastener.

Example 19 includes the vehicle of example 18, wherein the second bushing is threadedly coupled to the fastener.

Example 20 includes the vehicle of example 15, wherein the fastener is threadedly coupled to the chassis.

The following claims are hereby incorporated into this Detailed Description by this reference, with each claim standing on its own as a separate embodiment of the present disclosure.

What is claimed is:

1. An apparatus to couple a first structure to a second structure, the apparatus comprising:
a first bushing including:
a first outer diameter;
a first inner diameter; and
a first curved surface disposed between the first outer diameter and the first inner diameter, the first curved surface to receive a corresponding second curved surface of the first structure, wherein the first curved surface is convex;
a second bushing including:
a second outer diameter;
a second inner diameter; and
a third curved surface disposed between the second outer diameter and the second inner diameter, the third curved surface to receive a corresponding fourth curved surface of the first structure, wherein the third curved surface is convex; and
a fastener extending through the first bushing and the second bushing, the fastener to extend through a portion of the second structure.

2. The apparatus of claim 1, further including:
a first retention ring to be disposed within a first groove of the second curved surface; and
a second retention ring to be disposed within a second groove of the fourth curved surface.

3. The apparatus of claim 1, wherein the first bushing is threadedly coupled to the fastener.

4. The apparatus of claim 3, wherein the first bushing includes a first anti-rotation feature to be received by a corresponding second anti-rotation feature of the first structure, the first anti-rotation feature and the second anti-rotation feature to prevent relative rotation of the first bushing and the first structure.

5. The apparatus of claim 1, further including a nut abutting the first bushing, the nut threadedly coupled to the fastener.

6. The apparatus of claim 1, further including at least one of a lubricant disposed on the first curved surface or a liner disposed on the first curved surface.

7. A steering gear assembly including:
a steering gear;
a steering gear mount to couple the steering gear to a chassis of a vehicle, the steering gear mount including:
a first curved surface; and
a second curved surface opposite the first curved surface;
a first bushing including:
a first outer diameter;
a first inner diameter; and
a first end between the first inner diameter and the first outer diameter, the first end including a third curved surface, the third curved surface forming a first interface with the first curved surface;
a second bushing including:
a second outer diameter;
a second inner diameter; and
a second end between the second outer diameter and the second inner diameter, the second end including a fourth curved surface, the fourth curved surface forming a second interface with the second curved surface; and
a fastener extending through the first bushing, the second bushing and the steering gear mount.

8. The steering gear assembly of claim 7, further including:
a first retention ring disposed within a first groove of the first curved surface; and
a second retention ring disposed within a second groove of the second curved surface.

9. The steering gear assembly of claim 7, wherein the first bushing is threadedly coupled to the fastener.

10. The steering gear assembly of claim 9, wherein:
the first bushing includes a first anti-rotation feature; and
the steering gear mount includes a second anti-rotation feature, the first anti-rotation feature and the second anti-rotation feature to prevent relative rotation of the first bushing and the steering gear mount.

11. The steering gear assembly of claim 7, further including a nut abutting the first bushing, the nut threadedly coupled to the fastener.

12. The steering gear assembly of claim 7, wherein:
the first curved surface and the second curved surface are concave; and
the third curved surface and the fourth curved surface are convex.

13. The steering gear assembly of claim 7, further including at least one of a lubricant disposed on the first curved surface or a liner disposed on the first curved surface.

14. A vehicle including:
a chassis;
a steering gear;
a steering gear mount to couple the steering gear to the chassis, the steering gear mount including;
a first side; and
a second side;
a first bushing including:
a first outer diameter;
a first inner diameter; and
a first surface disposed between the first inner diameter and the first outer diameter, the first surface forming a first curved interface with the first side;
a second bushing including:
a second outer diameter;
a second inner diameter; and
a second surface disposed between the first inner diameter and the first outer diameter, the second surface forming a second curved interface with the second side; and
a fastener extending through the first bushing, the second bushing and the steering gear mount.

15. The vehicle of claim 14, wherein the first bushing includes a third surface abutting the chassis, the first surface opposite the third surface.

16. The vehicle of claim 15, wherein the second bushing includes a fourth surface abutting a cap of the fastener, the second surface opposite the fourth surface.

17. The vehicle of claim 15, wherein the second bushing includes a fourth surface abutting a nut, the second surface opposite the fourth surface, the nut threadedly coupled to the fastener.

18. The vehicle of claim 14, wherein the second bushing is threadedly coupled to the fastener.

19. The vehicle of claim 14, wherein the fastener is threadedly coupled to the chassis.

* * * * *